US005320398A

United States Patent [19]

Popp et al.

[11] Patent Number: 5,320,398

[45] Date of Patent: Jun. 14, 1994

[54] TIE-DOWN MECHANISM FOR AUTOMOBILE TRUNK LID

[76] Inventors: Brian G Popp, 8440 Easton Commons, Apt. 1012, Houston, Tex. 77095; Norbert B. Popp, Box 422, Ganado, Tex. 77962

[21] Appl. No.: 14,138

[22] Filed: Feb. 5, 1993

[51] Int. Cl.[5] .......... B62D 25/10

[52] U.S. Cl. .......... 296/76; 292/288

[58] Field of Search .......... 296/76; 292/288; 242/107.6

[56] References Cited

U.S. PATENT DOCUMENTS

| | | | |
|---|---|---|---|
| 551,645 | 1/1895 | Newell . | |
| 1,167,262 | 1/1916 | Blackall . | |
| 1,365,892 | 1/1921 | Craver . | |
| 1,514,901 | 1/1924 | Gilman . | |
| 1,537,717 | 5/1925 | Van Berkel . | |
| 2,916,902 | 12/1959 | Wamsley | 296/76 X |
| 2,919,946 | 1/1960 | Miener | 296/76 X |
| 2,973,217 | 2/1961 | Gregoire | 296/76 X |
| 3,011,818 | 12/1961 | Matthiessen | 296/76 X |
| 3,741,493 | 6/1973 | Jones . | |
| 3,937,415 | 2/1976 | Prinz . | |
| 3,971,589 | 7/1976 | Elrod | 296/76 |
| 4,153,220 | 5/1979 | Nakajima . | |
| 4,188,061 | 2/1980 | Shehi | 296/76 |

FOREIGN PATENT DOCUMENTS 3322768 1/1985 Fed. Rep. of Germany .......... 296/76

*Primary Examiner*—Joseph D. Pape
*Attorney, Agent, or Firm*—Marvin J. Marnock

[57] ABSTRACT

A tie-down mechanism for securing a pivotally-mounted automobile trunk lid 20 when objects 24 in the trunk are too large to allow the fully closing of the lid. The mechanism includes a reel 32 journalled for rotation on a reel housing 34 which is attached to the underside of the trunk lid. A flexible strap 41 wound on the reel spool is provided with a fastener 46 on its free end. A ratchet and pawl mechanism mounted on the reel housing includes a pawl 58 which is normally spring biased to lock the ratchet and reel against rotation in the unwinding direction. The reel is releasable by manual retraction of the pawl from engagement with the ratchet and the pawl held in the disengaged position by cooperation of a holding pin 70 on the pawl and a shoulder on the pawl carrier 56. With reel released, the strap can be withdrawn from the reel and its free end secured to an anchoring element 23 in the trunk. The reel 32 can then be manually rotated to tighten the strap, preferably when the pawl is released to engage the ratchet, such that the trunk lid tightly engages the objects in the trunk. By release of the pawl, the reel is locked against rotation in the unwind direction. It may then be rotated in the wind-up direction and the strap made taut to thereby secure the trunk lid in its tightly engaged position.

6 Claims, 3 Drawing Sheets

TIE-DOWN MECHANISM FOR AUTOMOBILE TRUNK LID

FIELD OF THE INVENTION

The invention relates to a tie-down mechanism and more particularly to a tie-down mechanism for holding down an automobile trunk lid when it cannot be completely closed because of the size of objects placed in the trunk.

BACKGROUND OF THE INVENTION

Because of the limited storage space in automobile trunk compartments, it is a frequent occurrence that the trunk lid cannot be completely closed because of the large size of objects placed therein. Other than removing the objects, the lid can be left loose during travel or tied down by the most available means. However, if left loose or not securely tied down, the lid may obscure the vision of the driver or it may bounce, causing damage to the objects in the trunk, or create disconcerting noise. A loose lid may also be hazardous to other drivers in the event something should fall out of the trunk during travel. Heretofore, a rope or wire has been most often resorted to as a means for tying down the trunk lid, but such ropes or wires are frequently not available when needed and oftentimes are of inappropriate length or diameter when considering the available tie-down locations and the possible anchoring members on the lid itself, or the floor and walls of the trunk compartment, or on the automobile exterior. Although there are various reel devices which include fastening means on the ends of the reeled line or tape these are not always suitable for use in holding down a trunk lid. In most such devices, the reel itself cannot be readily fastened to the trunk lid in a secured manner and a spring is included for biasing the reel to the fully wound position. Reliance on a spring for winding the reel is not desirable for use in tie down of an automobile trunk lid because of the tendency of the lid to bounce under rough road conditions and because of the lack of a positive fix with respect to the length of line or tape which is withdrawn from the reel.

SUMMARY OF THE INVENTION

The invention relates to a tie-down mechanism for securing a pivotally mounted automobile trunk lid in tight engagement with objects in the trunk when the objects are too large to allow fully closing of the trunk lid. The mechanism includes a reel journalled for rotation on a reel housing which is attached to the underside of the trunk lid. A flexible strap wound on the reel spool is provided with a fastener on its free end. A ratchet and pawl mechanism mounted on the reel housing includes a pawl which is normally spring biased to lock the ratchet and reel against rotation in the unwind direction but not in the wind-up direction. The reel is releasable by manual retraction of the pawl from engagement with the ratchet and the pawl held in the disengaged position by cooperation of a holding pin on the pawl and a shoulder on a pawl carrier. With reel released, the strap can be withdrawn from the reel and its free and secured to an anchoring element in the trunk. The pawl can then be released to engage the ratchet and preclude rotation of the reel in the unwind direction while the reel is manually rewound to tighten the strap and hold the trunk lid tightly against the objects in the trunk.

DETAILED DESCRIPTION OF THE INVENTION

Figure 1:
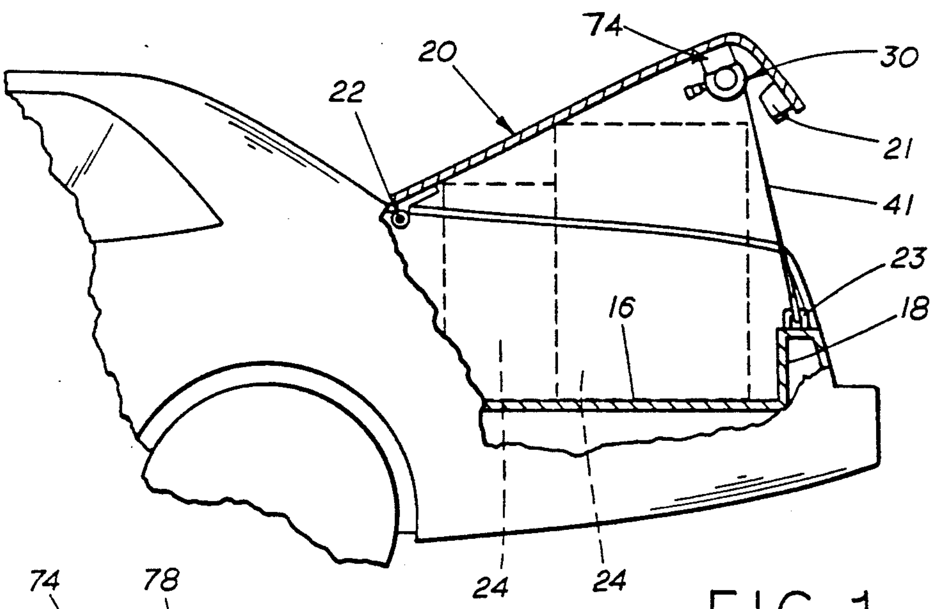
FIG. 1 is a side view of the tie-down device of the invention, showing its installation in the trunk compartment of an automobile, parts of which are broken away to better show the installation.

Referring more particularly to FIG. 1 of the drawings, there is shown the rear portion of an automobile which has a trunk compartment at the rear end thereof. The trunk compartment includes a floor 16, an upstanding rear wall 18, and a trunk lid 20 which is pivotally mounted to the frame of the automobile by a pivot hinge connection 22. A spring latch 21 is mounted on the underside of the lid 20 at the free end of the lid and is adapted to latchingly engage a keeper or striker in the form of an eyelet 23 mounted atop the wall 18 when the trunk lid is moved down to close the trunk. The latch 21 may be of the conventional type which can be unlocked and released by a key.

Also shown in the trunk compartment by dashed lines are objects 24 which have been placed in the trunk but are of such large size that the trunk lid cannot be swung downward to the position necessary for the latch to engage the eyelet.

There is also shown in FIG. 1 a tie-down mechanism 30 which represents a preferred embodiment of the invention. The tie-down mechanism 30 is shown in an operative condition wherein the lid 20 is in the lowermost position allowed by the obstructing objects in the trunk compartment and is securely held in that position by the mechanism 30.

Figure 2:
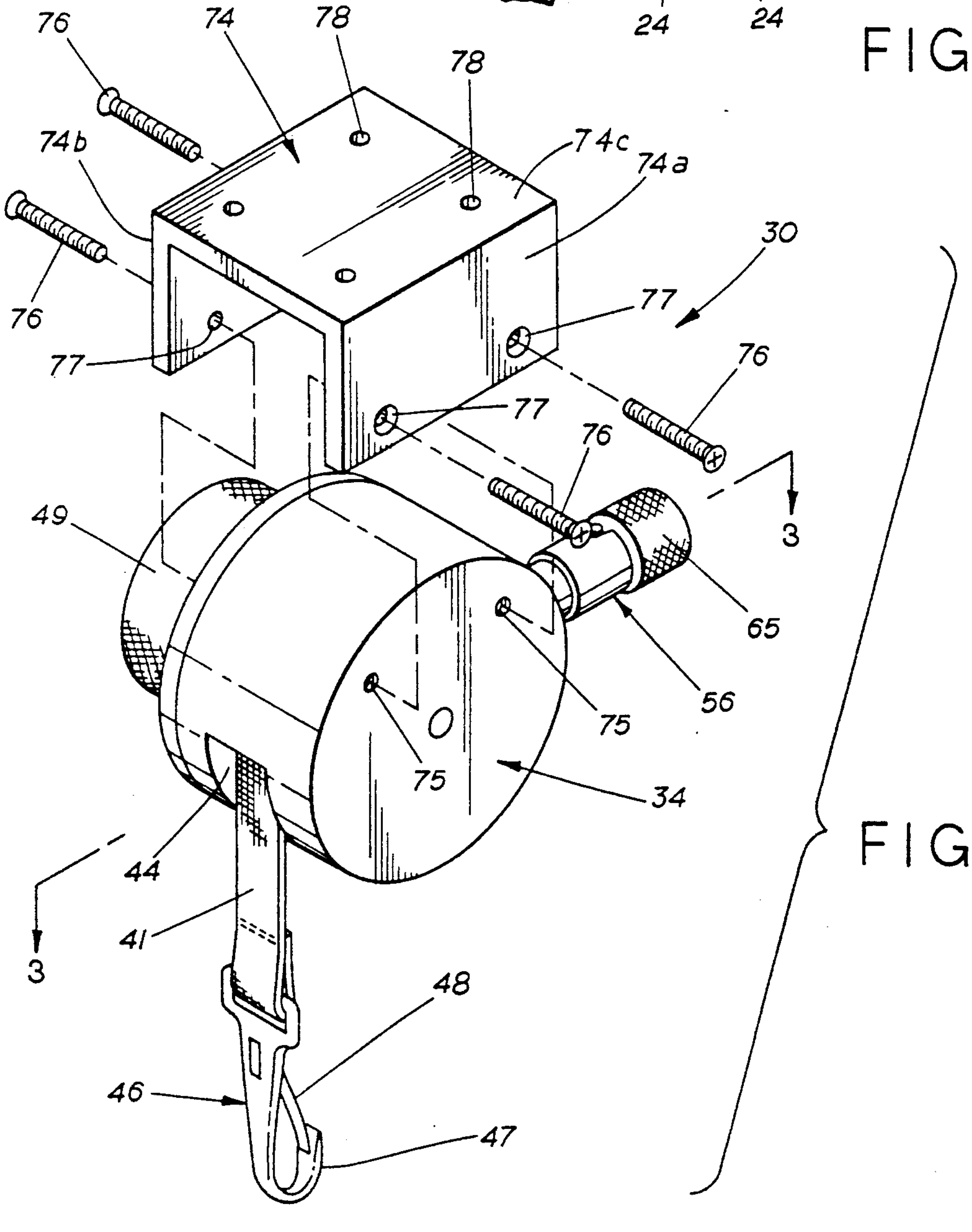
FIG. 2 is an exploded view in perspective of the tie-down device of FIG. 1.
Figure 3:
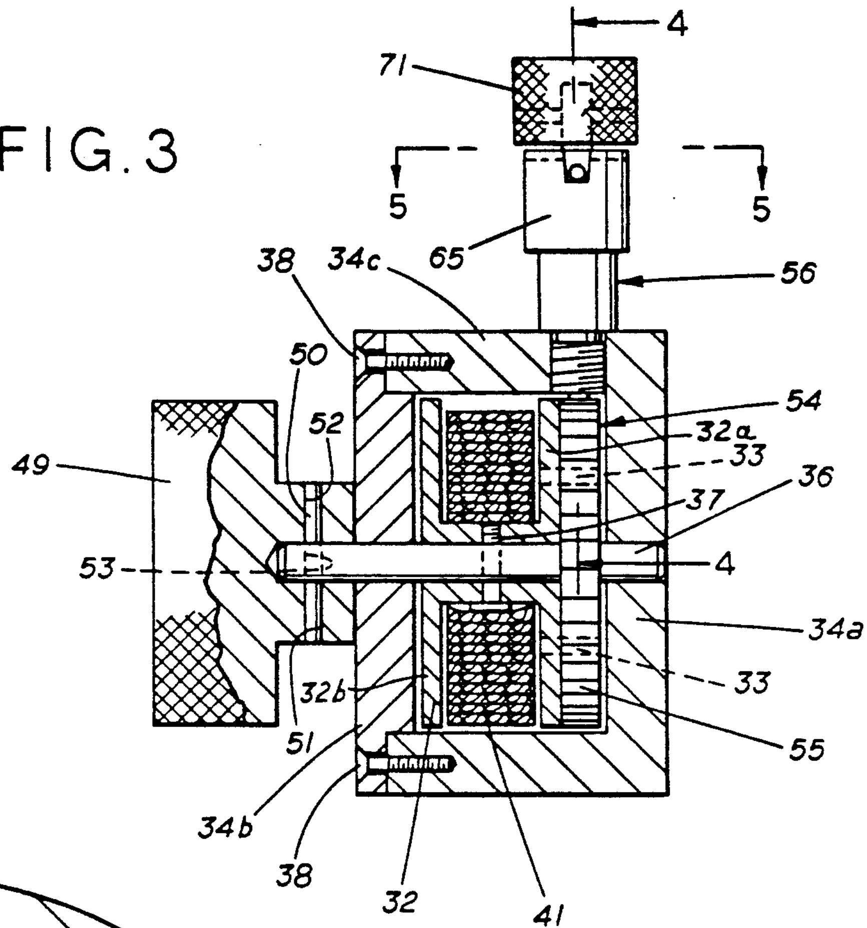
FIG. 3 is a view of the tie-down device of the invention as taken along the section line 3—3 in FIG. 2, with the mounting bracket omitted therefrom.

As shown enlarged in FIGS. 2 and 3, the mechanism 30 includes a reel 32 which is enclosed in a reel housing 34 and supported on a central axial shaft 36 for rotation therein on journal bearing surfaces formed by openings in the housing walls 34*a*, 34*b* for accommodating the shaft 36. Preferably, the housing is a two part construction comprising a cup-like portion with a cylindrical wall 34*c* of circular cross-section which is closed at one end by a transverse planar wall 34*a* integrally formed therewith. The housing also includes the transverse wall 34*b* which is fastened to the circular end of wall 34*c* by means of screws 38. The walls 34*a*, 34*b* are each provided with central openings which receive the shaft 36. The openings are defined by surfaces which provide bearing surfaces for the shaft 36 and allow its axial rotation.

A flexible strap 41 is spirally wound upon itself between the spool flanges 32*a*, 32*b* with its inner end fixed to the spool shaft 36 by a clamping screw 37 and its other end extending through a slotted exit opening 44 provided in the cylindrical wall 34c of the reel housing. The free end of the strap 41 is provided with a fastener 46 of a conventional type having a hook 47 with a resilient closure element 48 which allows securing the fastener hook to appropriate anchoring devices. The fastener 46 is of larger dimension than the exit opening 44 and when in abutting engagement with the wall 34c, the strap 41 is in its most fully wound position on the reel 32.

The shaft 36 extends beyond the wall 34b of the reel housing and is fitted with a knurled knob 49 which is sleeved thereon and secured thereto by a cross pin 50 which is fitted through accommodating transverse bores 51, 52 in the knob and a transverse opening 53 through the projecting end of the shaft 36.

Also fixed to the reel 32 and mounted thereon within the reel housing 34 is a ratchet wheel 54 which is directly fixed to flange 32a by screws 33. The ratchet wheel 54 has a central axial opening which receives the shaft 36 therethrough and is provided with ratchet teeth 55 formed about its peripheral edge.

Figure 4:
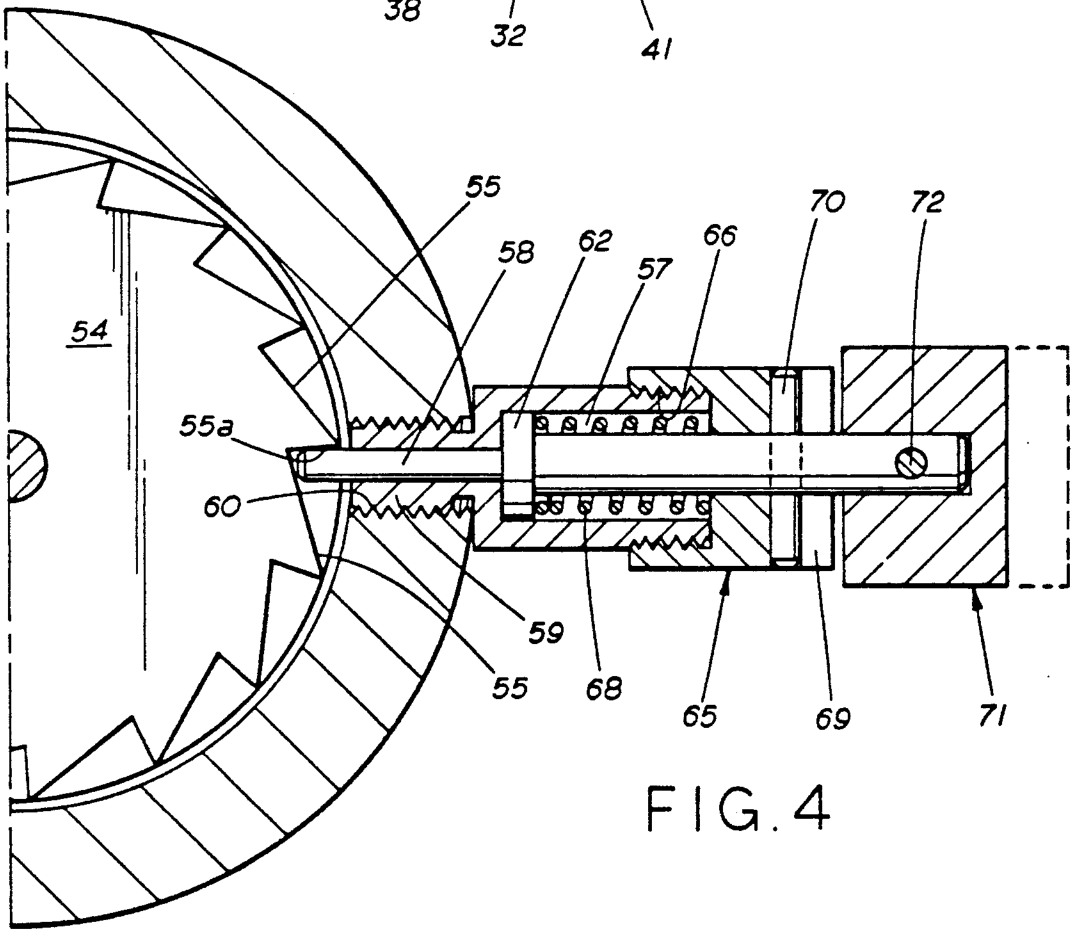
FIG. 4 is a fragmentary section view taken along the section line 4—4 in FIG. 3 showing details of a ratchet and pawl mechanism included in the invention.
Figure 5:
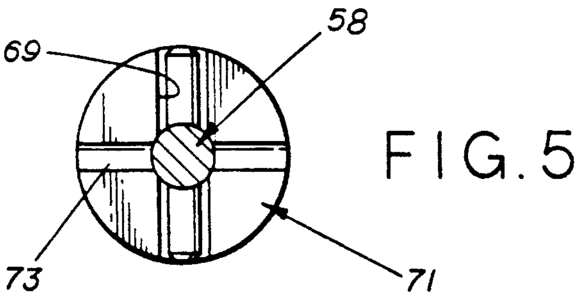
FIG. 5 is a section view of the pawl carrier as taken along the section line 5—5 in FIG. 3.

Also mounted on the cylindrical wall 34c of the reel housing is a pawl carrier 56 with a cylindrical chamber 57 in which is mounted a pawl 58 as best seen in FIG. 4. The pawl carrier includes a coaxial extension 59 at the base of the chamber 57 and which is provided with external threads. The reel housing is provided with a threaded opening 60 which receives the threaded extension of the pawl carrier in a threaded connection therewith. The pawl carrier extension 59 is provided with a coaxial bore which communicates with the carrier chamber 57 and receives the end portion of the pawl 58 which is adapted to engage with the teeth of the ratchet wheel. The pawl 58 is provided with an annular flange 62 which stops against the bottom wall of the carrier chamber 57 when the tip of the pawl engages the ratchet teeth as shown in FIG. 4 with a radially extending edge 55a of one of the ratchet teeth in abutting engagement with the shaft of the pawl 58.

Figure 6:
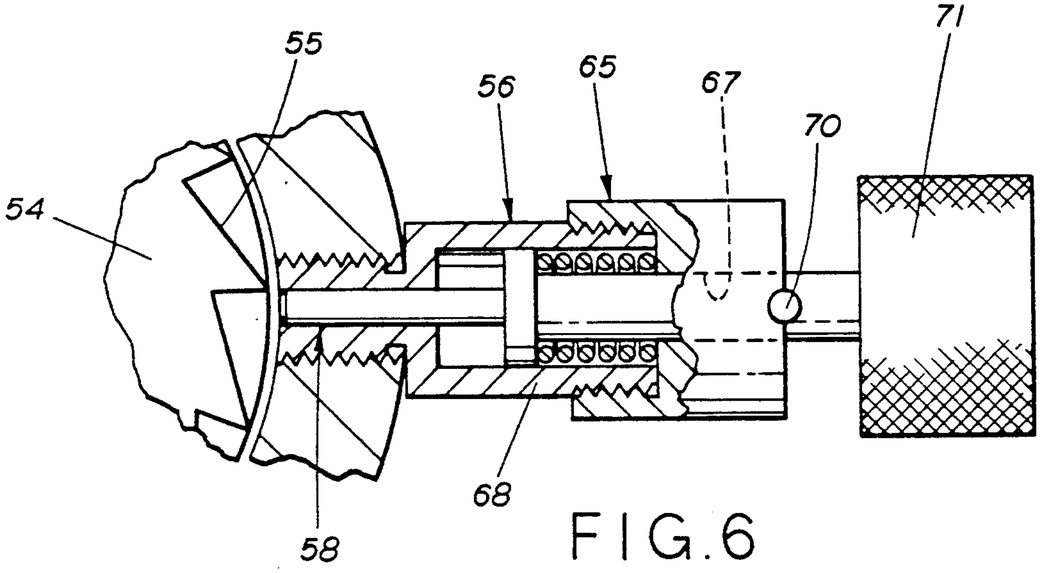
FIG. 6 is a fragmentary view, partly in section, of the ratchet and pawl mechanism of FIG. 4 showing the pawl in its release position.

As shown in FIG. 6, the end of the pawl carrier furthest from the reel housing is provided by a threaded cap 65 having an internally threaded bore 66 with a central counterbore 67 which extends through the cap and receives the shaft of the pawl 58 therethrough. The pawl 58 is biased towards engagement with the ratched wheel by a helically coiled spring 68 which is sleeved about the shaft of the pawl with one end of the spring engaging the pawl flange 62 and its other end engaging the annular shoulder provided by the threaded bore 66 of the cap 65. The cap 65 is also provided in its end surface with a groove 69 which extends diametrically across the end face of the cap and is adapted to receive a holding pin 70 which extends transversely through the shaft of the pawl. The pawl 58 is of a length to extend beyond the cap 65 and is also provided with a knob 71 which is fitted to the outer end of the pawl shaft in suitable fashion as by a pin 72 which extends transversely through the pawl shaft. The knob 71, when grasped and pulled outward, facilitates the extraction of the pawl from engagement with the ratchet wheel in counteraction to the biasing force of the spring 68.

When the pawl 58 is extracted radially outward by a distance such that the pin 70 is removed from the transverse groove 69 in the cap 65, the pawl 58 becomes axially rotatable whereby if rotated approximately ninety degrees and knob 71 released the pin 70 will engage the end face of the cap 65 in a shallow groove 73 and thereby hold the pawl in its extracted disengaged position as shown by dashed lines in FIG. 4. In this position of the pawl, the reel is in a free running condition whereby the strap 41 can be manually unwound and withdrawn from the reel. By further rotating the pawl shaft to an orientation where by holding pin 70 aligns with the groove 69, the knob 71 can then be released to allow the spring-biased pawl to engage with the ratchet teeth and lock the reel shaft from rotation and to fix the length of the strap which has been withdrawn therefrom.

Referring to FIGS. 1 and 2, it will be seen that the reel housing 34 is also fitted with an adaptor bracket 74 of U-shape in cross-section which fits as a saddle astride the cylindrical wall of the reel housing 34 and is attached thereon by screws 76 which are accommodated through holes 77 in the sides 74a, 74b of the bracket 74, and threaded holes 75 in the housing walls 34a and 34b.

The bracket 74 is also provided with bolt holes 78 through its transverse wall 74c which facilitates its bolted connection to the underside of an automobile trunk lid as shown in FIG. 1. The trunk lid is typically provided with a protective liner or a support brace (not shown) to which the bracket 74 is bolted. The bracket 74 and reel housing 34 are oriented with respect to the trunk lid 20 such that the slotted opening 44 in the reel housing with protruding strap 41 are faced to the rear of the car and the reel is mounted near the end of the trunk lid remote from its hinged connection.

It is therefore to be noted that the tie-down mechanism 30 representative of a preferred embodiment of the invention is particularly adapted for use in tying down in a secure manner an automobile trunk lid or any other vehicle trunk lid when the trunk compartment contents are of such size that the trunk lid cannot be completely closed. In a storage condition as shown in FIG. 1 where one or more large objects so obstruct the pivotal movement of the trunk lid that it cannot close, the securing of the trunk lid 20 involves the steps of forcing the lid downwardly in pivotal movement to where the lid engages the objects 24 in the trunk. The pawl 58 is then manually retracted to release the reel 32, and the pawl axially rotated by approximately ninety degrees to where the holding pin 70 is out of register with respect to the transverse groove 69 in the carrier cap 65. The pawl shaft knob 71 is then released whereby the pawl is retained in the disengaged position with respect to the ratchet wheel and the reel is in the free-running condition. The strap 41 is then unwound from the reel 32 and attached by its end fastener 46 to an anchoring element such as the striker eyelet 23 mounted atop the wall 18 of the trunk compartment. In this condition, the pawl shaft knob is then rotated to align the pawl holding pin 70 with the groove 69 in the pawl carrier and then released whereby the pawl is spring-biased into engagement with the ratchet teeth which prevents the reel from further unwinding in the clockwise direction of rotation as viewed in FIG. 4 but does not prevent its re-winding. The reel shaft is then manually rotated in the counterclockwise direction to rewind the strap 41 until the strap becomes taut. It is therefore possible to fix the trunk lid tightly against the objects in the trunk such that it will secure the objects in the trunk and not bounce loose of the objects during travel under rough road conditions.

Figure 7:
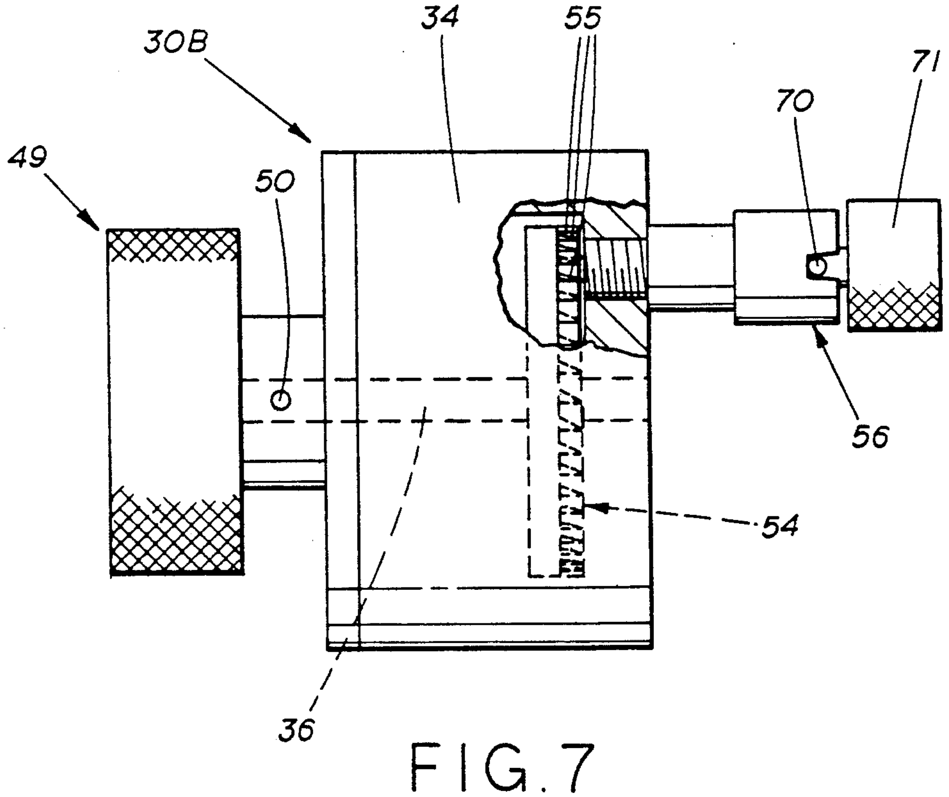
FIG. 7 is a side view of an alternate embodiment of the invention with the mounting bracket removed therefrom for clarity.

In FIG. 7 there is shown a modification of the tie-down mechanism of the invention wherein the pawl carrier is mounted on a transverse end wall of the reel housing, such as the end wall 32*a*. The tie-down mechanism 30*b* in FIG. 7 is identical to the mechanism 30 shown in FIGS. 1 through 6 except for the end wall mounting of the pawl carrier and the right angle orientation of the pawl with respect to the ratchet wheel on which the ratchet teeth are formed on the planar side surface of the wheel rather than its edge. Since the component parts of the tie-down mechanisms 30 and 30*b* are identical, the same reference numbers are used for designating like parts. The installation and operation of the two tie-down mechanisms are also identical.

It is therefore to be understood that the foregoing description of the invention has been presented for purposes of illustration and explanation and is not intended to limit the invention to the precise forms disclosed herein. For example, the positions of the reel housing and the anchoring element for the free end of the tape might be changed to where the reel housing is attached to the floor of the trunk and the anchoring element located on the trunk lid. It is to be appreciated therefore that various component and structural changes may be made by those skilled in the art without departing from the spirit of the invention.

We claim:

1. A tie-down mechanism for an automobile trunk lid, said mechanism comprising:

a reel housing, said housing having a slotted opening;

means for rigidly fastening said reel housing to the underside of an automobile trunk lid, said trunk lid being mounted for pivotal movement between a first position wherein the trunk is fully open and a second position wherein the trunk is fully closed;

a spool shaft jounalled for axial rotation on said housing, said shaft having one end portion projecting from said housing;

a spool fixed within said housing to said shaft in coaxial relation therewith;

a knob fastened at the end of the shaft which projects from the reel housing to preclude relative movement between said knob and said shaft;

an elongate flexible strap fixed at one end to said spool and being spirally wound on said spool with the other end portion thereof projecting through the slotted opening in said housing as a free end whereby said strap can be unwound from the spool and withdrawn from said housing by pulling on its free end;

a ratchet wheel fastened on said shaft within said housing and in coaxial relation to said shaft, said ratchet wheel having teeth formed about its periphery;

a pawl mounted on said reel housing for movement into and out of engagement with the ratchet teeth;

means for biasing said pawl into engagement with the ratchet teeth whereby said ratchet and spool are rotatable only in the direction which winds the strap onto the spool;

means which is selectively operable for manually removing the pawl from its position of engagement with the ratchet teeth in counteraction to said biasing means;

means selectively operable for releasbly holding the pawl in its disengaged position with respect to the ratchet teeth to thereby allow rotation of said shaft and spool in either direction whereby said strap can be unwound from the spool and withdrawn from the reel housing; and fastener means on the free end of said flexible strap whereby when objects placed in the trunk are of a size which prevents moving the trunk lid to the fully closed position said strap may be unwound from the spool when the pawl is disengaged from the ratchet by operation of said releasable holding means and the free end of said strap attached to an anchoring member in said trunk, said shaft being rotatable a desired amount of axial rotation by manually turning said knob to shorten the length of strap withdrawn from the housing when said holding means is rendered inoperative and to hold said trunk lid tightly against the objects in the trunk while said holding pawl engages the ratchet and locks the spool against further rotation and the strap from further withdrawal.

2. A tie-down mechanism for a vehicle trunk lid, said trunk including trunk components comprising a trunk body and a trunk lid and said tie-down mechanism comprising: means for supporting a reel for rotation thereon;

means for rigidly fastening said reel support means to one of said structural components of said trunk;

a spool shaft journalled for axial rotation on said reel support means;

a spool fixed to said shaft in coaxial relation therewith;

and elongate flexible strap fixed at one end to said spool and being spirally wound on said spool and having a readily accessible free end position whereby said strap can be unwound from the spool and withdrawn from said reel by pulling on its free end portion;

a ratchet wheel having a plurality of ratchet teeth formed along its peripheral edge, said ratchet wheel being fastened on said shaft in coaxial relation therewith;

a pawl mounted on said reel support means for movement into and out of engagement with the ratchet teeth and preventing rotation of said spool when engaged with the ratchet teeth;

means for biasing said pawl into engagement with the ratchet teeth;

means selectively operable for moving the pawl from its engagement with the ratchet teeth;

releasable holding means for releasably holding the pawl in the out of engagement position with the ratchet teeth in counteraction to said biasing means;

means for manually rotating said shaft when the pawl is disengaged from the ratchet teeth; and fastener means on the free end portion of the flexible strap whereby when objects placed in the trunk are of a size which prevents moving the trunk lid to the fully closed position said strap may be unwound form the spool when the pawl is disengaged from the ratchet by operation of said releasable holding means and the free end of said strap attached to the other of said trunk structural components, said shaft being rotatable in a desired amount of axial rotation by manually operating said rotation means to shorten the length of strap withdrawn from the reel when said holding means is rendered inoperative and hold said trunk lid tightly against the objects in the trunk while said hold pawl engages the ratchet and locks the spool against further rotation and the strap from further withdrawal.

3. A tie-down mechanism for a vehicle trunk lid as set forth in claim 2 wherein said ratchet teeth are formed on the peripheral edge of the ratchet wheel and said pawl is mounted on said reel support means for movement in co-planar relation to said ratchet wheel.

4. A tie-down mechanism for a vehicle trunk lid as set forth in claim 2 wherein said pawl is mounted on said reel support means for movement in orthogonal relation to said ratchet wheel.

5. A tie-down mechanism for a vehicle trunk lid as set forth in claim 2 wherein said trunk lid is provided with a latching element and said trunk body is provided with a cooperative latch striker adapted to latchingly engage with the latching element when the trunk lid is in closed position, said latch striker adapted to serve as an anchoring member for said fastener means on the free end of the strap.

6. A tie-down mechanism for a vehicle trunk lid, said mechanism comprising: a reel housing, said housing having an opening;

means for rigidly fastening said reel housing to the underside of said trunk lid;

a spool shaft journalled for axial rotation on said housing;

a spool fixed to said shaft in coaxial relation therewith;

and elongate flexible strap fixed at one end to said spool and being spirally wound on said spool with a free end portion thereof projecting through the opening in said housing whereby said strap can be unwound from the spool and withdrawn from said housing by pulling on its free end portion;;

a ratchet comprising a plurality of ratchet teeth formed in circular array about said spool shaft, said ratchet being fixed to said shaft in coaxial relation therewith;

a pawl member mounted on said reel housing for selective movement into and out of engagement with the ratchet teeth whereby when said spool is engaged with the ratchet teeth, said spool is precluded from rotation in the direction which unwinds the strap from the spool;

means for biasing said pawl member into engagement with the ratchet teeth;

releasable holding means selectively operable for releasing said pawl member and holding the pawl member in the out of engagement position with respect to the ratchet teeth in counteraction to said biasing means;

means for manually rotating said shaft in either direction of axial rotation when the pawl member is disengaged from the ratchet teeth; and fastener means on the free end position of the flexible strap whereby when objects placed in the trunk are of a size which prevents moving the trunk lid to the fully closed position said strap may be unwound from the spool when the pawl member is disengaged from the ratchet by operation of said releasable holding means and the free end of said strap attached to an anchoring member in said trunk, said shaft being rotatable by operating said rotation means to shorten the length of strap withdrawn from the housing when said holding means is rendered inoperative and to hold said trunk lid tightly against the objects in the trunk while said pawl member engages the ratchet and locks the spool against further rotation and the strap from further withdrawal.

* * * * *